Fig. 1

June 8, 1943.     E. B. NOWOSIELSKI     2,321,506
MAGNETO CONSTRUCTION
Filed Jan. 25, 1941     5 Sheets-Sheet 3

INVENTOR
Edward B. Nowosielski
BY
A. D. T. Libby
ATTORNEY

June 8, 1943.  E. B. NOWOSIELSKI  2,321,506
MAGNETO CONSTRUCTION
Filed Jan. 25, 1941    5 Sheets-Sheet 5

Fig.10

Inventor
Edward B. Nowosielski
By Henry Lanahan
Attorney

Patented June 8, 1943

2,321,506

UNITED STATES PATENT OFFICE 2,321,506

MAGNETO CONSTRUCTION

Edward B. Nowosielski, Bloomfield, N. J., assignor to Edison-Splitdorf Corporation, West Orange, N. J., a corporation of New Jersey Application January 25, 1941, Serial No. 375,996

13 Claims. (Cl. 171—209)

This invention relates to magnetos and more particularly to magnetos of the rotary-magnet type. This application is a continuation in part of my co-pending application, Serial No. 326,562, filed March 29, 1940 and entitled "Magneto construction," and now being abandoned upon the filing of this application.

It is a broad object of my invention to provide a generally improved form of magneto and especially one which is particularly well suited for use in the aircraft field.

The operating and structural requirements for aircraft magnetos are very rigid. These magnetos are driven to their full capacity, are subjected to heavy vibration and are operated under extreme weather conditions; yet they must be capable of firing high-powered, high-speed engines with well-nigh absolute reliability through long periods of service. In addition, it is of prime importance that they be both light and small in construction.

It is an object of my invention to provide a magneto which will fulfill these objectives and, more particularly, to provide a small light magneto which is strong in its construction and both dependable and efficient in its operation.

It is another object to provide a magneto of improved efficiency and output, particularly at low speeds whereby to facilitate engine starting.

It is a further object to provide a light, compact magneto capable of efficiently and reliably serving engines of many cylinders.

A feature of my invention, in the interest of improved efficiency of the magneto, is to employ a permanent-magnet rotor of the two-pole type and then rotate this rotor at such speed as will provide the necessary number of ignition sparks per revolution of the engine. The area of each pole face of a two-pole rotor may be much larger than that of a rotor having many poles and this will be true, of course within limits, even though the multipolar rotor is of larger overall size. Such increased polar area of the rotor, by the decrease which it permits in the reluctance of the magnetic circuit of the magneto, greatly increases the efficiency of the magneto operation.

It will be understood that a magneto which has a two-pole rotor and which is to serve a four-cycle engine of more than four cylinders will have to have its rotor driven at speeds higher than that of the engine. This increased rotor speed is found to be beneficial in improving still further the efficiency of the magneto.

It is thus a feature of my invention that the efficiency of the magneto is improved not only by the rotor construction, but also by a driving of the same at speeds higher than that of the engine.

It is another object to provide a step-up drive transmission for the rotor which is durable, efficient and noiseless.

It is a further object to mount the rotor and a separately journalled drive means therefor each in the vicinity of the place of support of the magneto housing whereby to increase the ruggedness of the magneto structure. To this end I mount the rotor and drive shaft with their axes normal to one another and couple the two together by means of a right-angle gearing. To fulfill the above stated objective of providing an efficient and noiseless drive transmission for the rotor, this gearing is preferably made of the spiral bevel type.

If the magneto drive shaft is driven at engine speed, or thereabout as is preferred, then it will be understood that the distributor—which is to be driven at one-half engine speed—will operate at a speed below that of the drive shaft. The driving of the distributor may in this case be very advantageously taken directly from the drive shaft as then the drive transmission ratio between the rotor and distributor, being taken up in part by the gearing between the rotor and drive shaft, will permit a gearing between the drive shaft and distributor which is of reduced ratio and permissibly therefore also of reduced size.

It is thus another object to provide a magneto arrangement wherein the gearing to the distributor is of reduced ratio and size, a feature of my invention, in this respect, being to journal the rotor and distributor each independently of the magneto drive shaft and to couple the rotor and distributor to the drive shaft through separate and independent drive transmissions.

Another object is to provide a rotor construction which has an improved efficiency and which is small, compact and rugged to permit rotation of the same at high speeds.

A still further object is to provide an improved magneto construction which is low in cost and so arranged as to permit an individual removal of certain main components thereof without disturbing the arrangement of its remaining components.

Other and allied objects and features of my invention will appear from the following description and the appended claims.

In the description of my invention reference is had to the accompanying drawings, of which.

The illustrative embodiment of my invention, shown in the accompanying figures, has a housing which comprises a main section 65 and a minor section or end cap 64 each of which is formed, for example, by casting and made of a suitable light, strong non-magnetic material such as aluminum. These housing sections meet on a vertical plane, at the line 4—4 of Figure 1, and are held together by clamping screws 90 as shown in Figure 2. The joint in the housing is rendered fluid-tight for the better protection of the interior parts of the magneto, by means of a gasket 66 which is clamped between the housing sections. At the drive end of the magneto—i. e., at the left end thereof as it appears in Figure 1— there is secured a mounting plate 1 having three equiangularly spaced extensions 1a. These extensions have openings 2 to receive clamping screws (not shown) for fastening the magneto to a suitable support such as an engine block, the outer surface of the plate being machined to provide a mounting face 1″ to fit the cooperating face of the support.

Extending centrally through the mounting plate 1 is a drive shaft 4 for the magneto, the outer end of which is provided with a gear 5 (dottedly shown). This gear is secured to the drive shaft by lock nuts and washers, generally referred to as 6, and forms one element of a gearing for coupling the magneto to an engine. To permit angular adjustment of the magneto about the drive shaft 4 as a center, for the purpose of adjusting the timing of the magneto in relation to the engine, the holes 2 in the mounting plate 1 are extended in the form of arcuate slots as shown in Figure 2. A proper centering or locating of the magneto in relation to the engine may be maintained by the engagement of an exterior annular shoulder 3 on the plate 1 with a suitable cooperating element of the magneto support (not shown).

Figure 1:
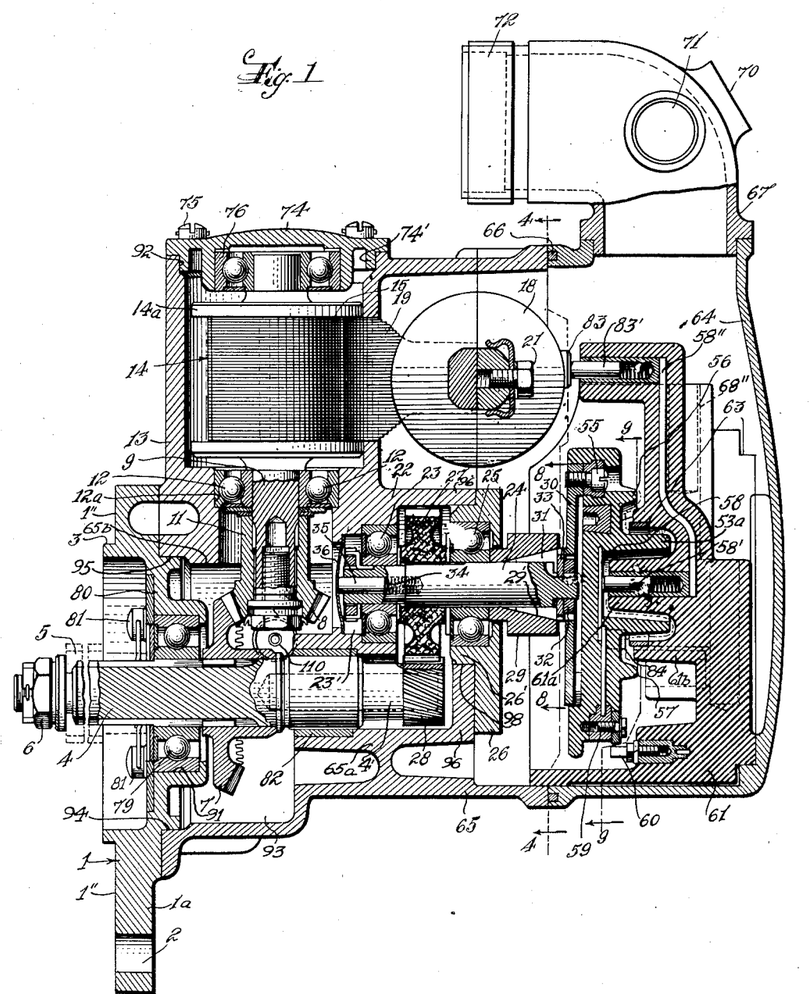
Figure 1 is a vertical sectional view through a magneto in accordance with my invention, the circuit breaker parts being, however, removed.
Figures 2, 7, 8:
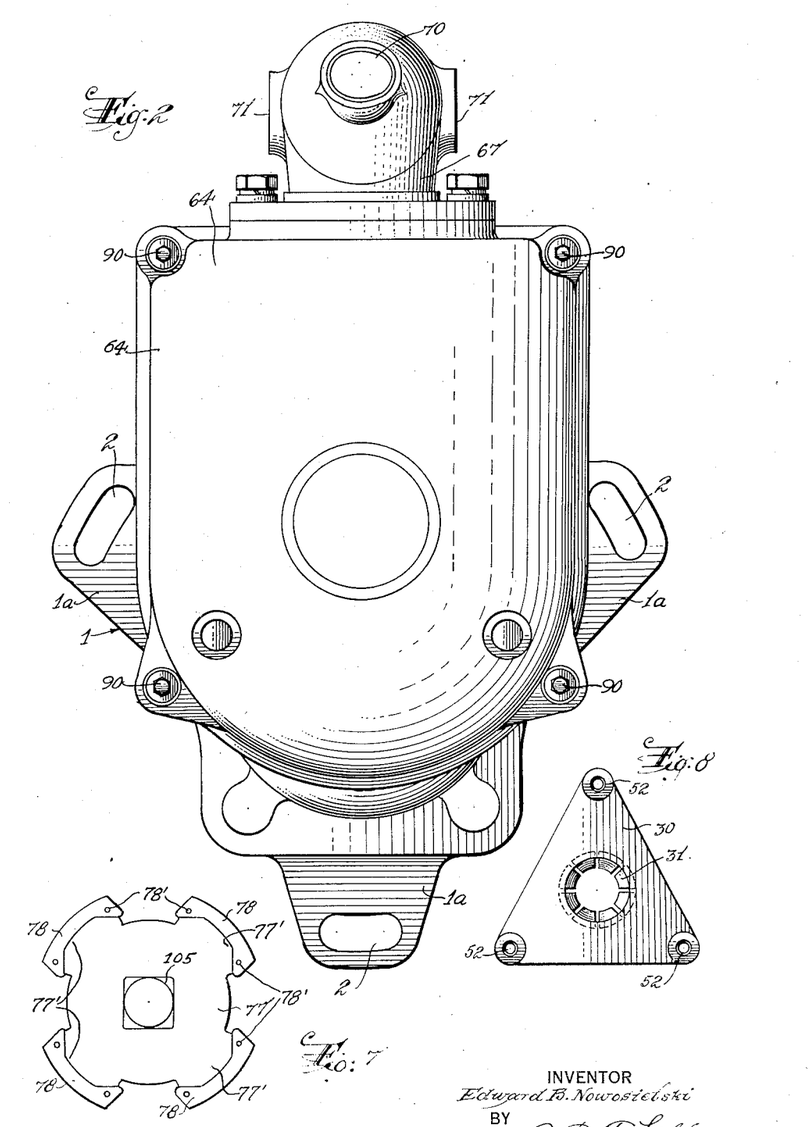
Figure 2 is a right end elevational view of the structure of Figure 1.
Figure 7 is a view showing a modified form of permanent magnet rotor.
Figure 8 is a view on the line 8—8 of Figure 1, showing in plan the mounting member for the distributor arm.
Figure 3:
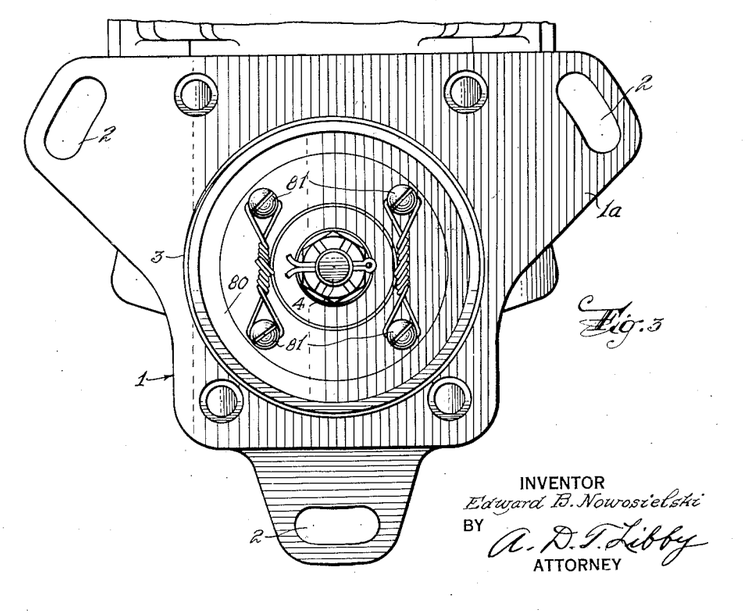
Figure 3 is a partial elevational view of the drive end of the magneto.
Figure 4:
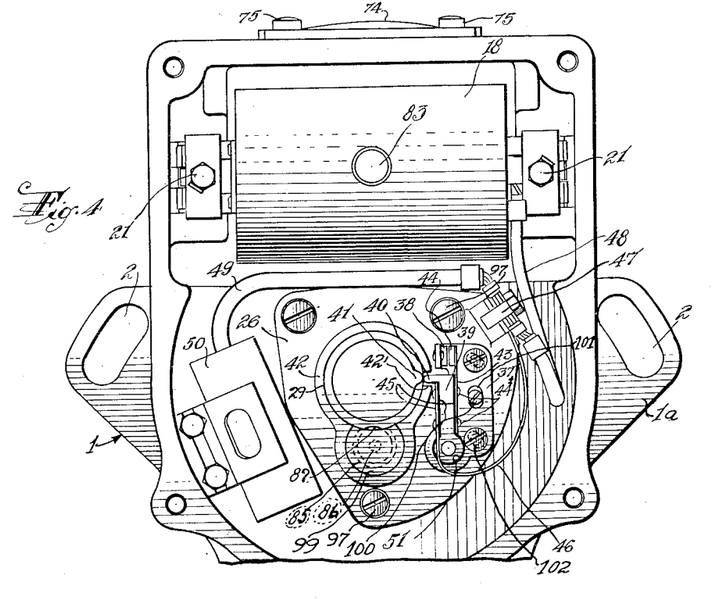
Figure 4 is a vertical view on the line 4—4 of Figure 1, with the circuit breaker in position.

The drive shaft 4 is relatively short, extending only about one-half of the way through the magneto as shown in Figure 1. This shaft has two bearings: a bearing 79 near the outer end of the shaft in the mounting plate 1 and a bearing 82 near the inner end of the shaft in a vertical partitioning wall 65a of the housing section 65. The bearing 79 is of the anti-friction type and is retained in a hollow boss 91 of the mounting plate by means of a disk 80 secured by screws 81 to the mounting plate; the bearing 82 is typically of the oil impregnated type and is retained in the partitioning wall 65a as by a press fit.

The rotor for the magneto, designated as 14, is supported in an axially vertical position at the drive end of the magneto. This rotor has a shaft 9 which journals in lower and upper bearings 12 and 76 each of which may be of the anti-friction type. The lower bearing 12 seats in a shouldered opening 12a provided in a horizontal extension 65b of the partitioning wall 65a. The upper bearing 76 is carried by a cap 74 on the top of the housing section 65. This cap is located by the engagement of an annular flange 74′ on the cap with an opening 92 in the housing section and is securely held to the housing section by screws 75.

A drive connection of the rotor to the drive shaft 4 is effected by a bevel gear 7, which is keyed to the shaft 4 between the bearings 79 and 82, and a cooperating gear 8 which is secured to the lower end of the rotor shaft by a screw stud and lock washer generally referred to as 10. (See Figure 10.) A sleeve extension 11 on the gear 8 is provided to form an auxiliary support for the anti-friction bearing 12. The gears 7 and 8 are housed in a grease compartment 93 formed in the housing section 65 by the partitioning walls 65a and 65b and by the mounting plate 1 at the drive end of the magneto. The open end of the grease compartment is bored out as at 94 to receive an annular flange 95 on the mounting plate concentric with the bearing 79, the fitting of this flange into the bore of the compartment serving to form a fluid-tight closure for the compartment and to accurately locate the mounting plate on the housing. While the gears 7 and 8 may be of a straight bevel type shown in Figure 1, they are preferably made of the spiral bevel type shown in Figure 10, wherein they are represented as 7a and 8a respectively, as gears of this latter type have improved wearing qualities and produce little noise in view of the large area of surface engagement between the gears.

Figure 10:
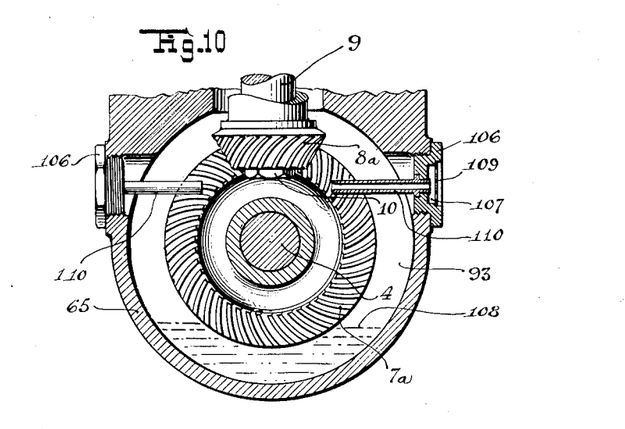
Figure 10 is a fragmentary vertical sectional view taken through the gear compartment at the drive end of the magneto and showing a venting means for this compartment and a modified form of gearing between the rotor and drive shaft.

To prevent the pressure in the gear compartment 93 from being built up and causing the oil or grease in the compartment to be forced out through the bearings 79 and 82 as the magneto heats up, this compartment is vented at its sides by means of apertured plugs 106 as shown in Figures 1 and 10. These plugs are threaded into the walls of the housing section 65 and are provided with central, exterior recesses 107. The recesses 107 are adapted to receive the nipple of a lubricating gun (not shown) to permit a suitable lubricant to be forced into the compartment through the plugs, a normal level of the lubricant in the compartment being about at the line 108 as shown in Figure 10. In normal use these recesses are provided with filters or screens 109 which are held therein as by a press fit. The apertures in the plugs 106 are fitted with tubes 110 which extend inwardly into the compartment and terminate near the center thereof. These tubes serve to prevent the lubricant in the compartment from running out through the plugs 106 when the magneto is turned over on its side, as in operation or in handling.

The opening 92 provides the passageway through which the rotor is placed into the housing and removed therefrom. This opening, being at the top of the housing and exposed merely upon removing the cap 74, permits easy mounting and removal of the rotor. Moreover, this mounting or removal of the rotor may be accomplished without disturbing any other adjustment of the machine, as will hereinafter be apparent. In a similar way, with respect to the drive shaft 4, a removal of the plate 1 will permit an independent removal of this shaft without disturbing the arrangement of the other elements of the magneto.

The mounting of the rotor 14 at the drive end of the magneto in a vertical position with its axis at right angles to that of the drive shaft has several marked advantages. For instance, it brings the center of gravity of the magneto very near the place of its support with the result that the strength requirements of the magneto housing are relaxed, vibration is reduced and a lighter housing or frame is permitted. Also, the right angle drive connection permits the use of a preferred type of gearing—the spiral bevel gearing above mentioned.

The rotor 14 is of a two-pole type and comprises two permanent magnets 15 made of a magnetic material of high coercive force such, for example, as that known commercially as Alnico. Those magnets are disposed on diametrically opposite sides of the rotor shaft 9, with their polar axes transverse to the axis of rotation of the rotor, and with the poles of like sign adjacent one another. The polar ends of the magnets are fitted with pole shoes 16, only one of which is shown (see Figure 5). These shoes are made up of laminations of high permeability which are assembled in stacked arrangement. The rotor has non-magnetic end plates 14a on the shaft which are clamped together against the magnets and pole shoes by means of rivets 17 which pass through the plates and the pole shoes, these rivets also serving to hold the laminations of the pole shoes in place. To avoid a magnetic leakage and attendant difficulties which may arise from magnetization of the rotor shaft, this shaft is made of a suitable non-magnetic material.

In the interest of compactness and of utilizing the cross sectional area of the rotor structure to maximum advantage, the rotor shaft 9 is provided with flats 9' on opposite sides thereof, to permit a reduction in the spacing between the magnets, and the magnets are made of a segmental shape. A concentration of the flux at the polar ends of the magnets, such as would cause an increase in reluctance through the polar end portions of the magnets, is however avoided by providing the pole shoes with peripheral portions 16', which overlap the entire periphery of the polar end portions of the magnets, and with central radial extensions 16" which bridge the space between the polar end portions of the magnets. The large bearing surface of the shoes on the magnets, as so obtained, serves not only to fulfill the purpose just mentioned but also to firmly hold the magnets in place, thus providing a solid and rugged rotor structure.

Figures 5, 6, 9:
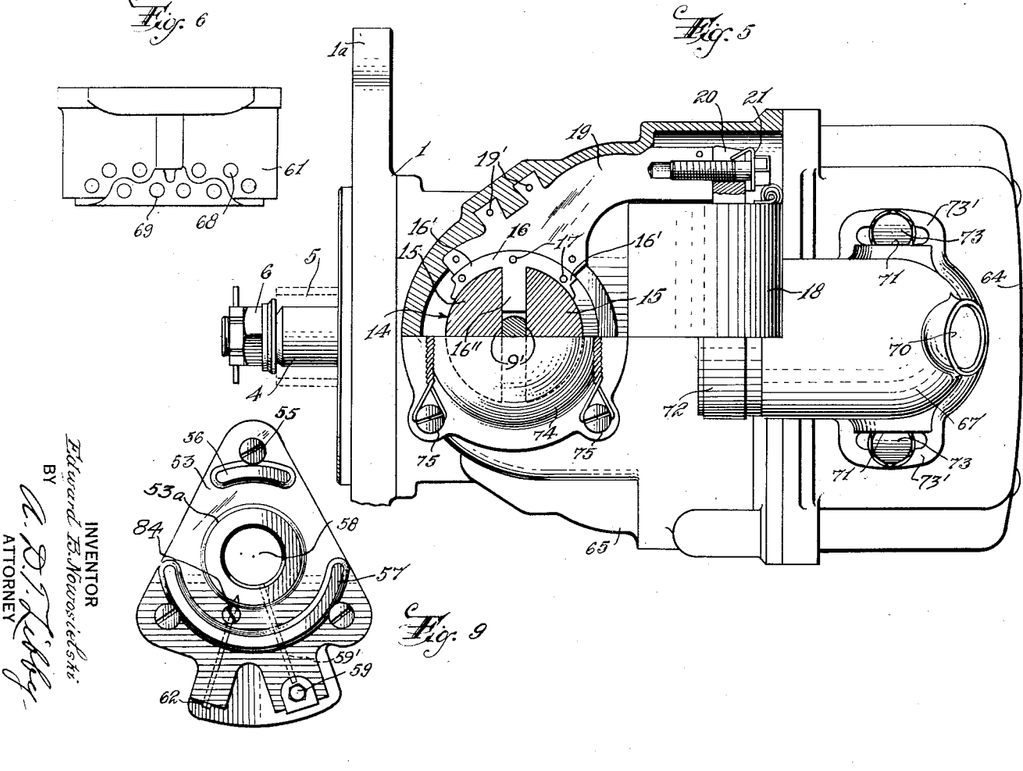
Figure 5 is a partial top plan view of the magneto, a portion of the housing being broken away to show the interior construction.
Figure 6 is a plan view to reduced scale of the distributor block.
Figure 9 is a view of the distributor arm taken substantially on the line 9—9 of Figure 1.

The rotor 14 is interposed between two field pole pieces, one of which appears as 19 in Figure 5. The pole pieces are in cast in opposite sides of the housing section 65 and firmly retained in place by the provision thereon of lugs 19' which interlock with the housing section. These pole pieces extend rearwardly from the drive end of the magneto and lie in a plane normal to the axis of the rotor. At their rearward ends they are bridged by a core 20 on which there is provided an ignition coil 18 having both low- and high-tension (primary and secondary) windings. Attachment of the core to the pole pieces is effected in any satisfactory manner as by screws and spring lock washers generally referred to as 21. The pole pieces and core each comprise laminae of high permeability secured together in stacked form as by riveting. In the case of the pole pieces, however, there are preferably employed laminations of shorter length than the others at suitable intervals in the stacks, and the extended portions of the longer laminations are then pressed together so as to form a portion of reduced cross section. In this manner the pole pieces are provided with polar faces of large cross section and are thus rendered more effective in picking up the flux from the rotor; while the portion of the pole pieces at the core are reduced to concentrate the flux and to direct the same more effectively through the center of the ignition coil wherein to effect the greatest number of flux linkages with the windings of the coil.

The circuit breaker and distributor for the magneto are both operated from a shaft 24 (which may be referred to as a timer-distributor shaft) which is parallel to the drive shaft 4 but offset vertically therefrom. This shaft 24 is driven from an end portion 4' of the drive shaft, which projects through the partitioning wall 65a as shown in Figure 1, by means of spiral gears 27 and 28 one of which is preferably made of a sound deadened material such as the insulating material known as textolite. The gears 27 and 28 are housed in a gear box formed by a hollow extension 96, which projects horizontally from the partitioning wall 65a, and a plate 26 which closes the end of this extension, the plate being secured to the end wall of the extension by screws 97. In opposite walls of this gear box—i. e., in the partitioning wall 65a and plate 26— there are provided bearings 23 and 25 for the shaft 24. In order that the bearing 25 may be accurately located, there is provided an interior hub 26' on the plate 26 and this hub is fitted into a circular opening 98 in the end wall of the extension 96. The end of the shaft 24 at the bearing 23 terminates in a recess 23' provided in the partitioning wall 65a behind the bearing and is there provided with a ground connection to the housing as is hereinafter explained; the other end of the shaft, however, projects through the plate 26 to drive the circuit breaker and distributor.

On the outer end portion of the shaft 24 there is provided a circuit-breaker cam 29. This cam is firmly secured to the shaft through the medium of a split cylindrically-shaped wedge 31 which is pressed tightly into a conical bore 29' in the cam, between the cam and the shaft. (The wedge 31 is integral with a plate 30, as shown in Figure 8, which serves as a mounting for the distributor arm as is hereinafter explained.) The pressing of the wedge between the cam and shaft is effected by means of a nut 32 which is threaded onto a reduced end portion of the shaft, the nut being retained in threaded position by a lock washer 33. The cam 29 may be housed in a protective casing 42 which is suitably secured to the plate 26. The casing 42 may be so shaped as to provide a chamber 85 for housing a lubricating roller 87, for the cam, this roller being suitably made of felt and being mounted on a stud 86, which stud may also serve to retain a small cap 99 over the end of the chamber.

The casing 42 is provided with a slit 42' through which projects a cam-cooperating finger 40 of a circuit-breaker arm 39. This arm is preferably wholly made of a suitable insulating material such as Bakelite, and is pivoted to a small bracket 37. This bracket is adjustable on the plate 26, to effect a proper spacing between the breaker arm and the cam, by means of an eccentrically headed screw 100 threaded into the plate 26 through a slot 101 in the bracket, the bracket being held in its adjusted position by screws 102 which clamp the bracket to the plate 26. Secured to one side of the circuit-breaker arm by a clamping plate 45 and rivets 44' is a spring 43; this spring carries a contact 44 which cooperates with a stationary contact 38 on the bracket 37. Secured to the other side of the arm, also by a clamping plate 45 and the rivets 44', is a current conducting spring 46 which is connected at its outer end to a terminal post 47, the spring 46 being however placed under sufficient strain to provide a proper bias of the circuit-breaker arm towards the cam and a suitable pressure between the contacts 38 and 44.

The spring 46 in addition to its biasing action, serves as an electrical conductor to the contact 44 and for this reason it is electrically connected to the spring 43, this electrical connection being effected through the rivets 44' and, in addition, through a metallic strip 51 which is folded around the hub of the circuit-breaker arm and clamped at its ends between the springs 43 and 46 and the circuit-breaker arm. The terminal post 47 is connected by a conductor 49 to a condenser 50 which is grounded to the frame of the magneto. Also the post 47 is connected by a conductor 48 to one side of the primary winding of the ignition coil 18. The other side of this winding is suitably grounded to the frame of the magneto as to the core 20 of the coil. Thus since the stationary contact 38 is grounded to the plate 26 through the bracket 37, the primary winding of the coil will be closed and opened each time the contacts 38 and 44 make and break.

In order to prevent any flow of current through the bearings 23 and 25, with a consequent injury to these bearings, such as would result should electric charges be permitted to accumulate on the shaft 24, there is provided the aforementioned special ground connection between the shaft and the frame as shown in Figure 1. This ground connection is made at the inner end of the shaft 24 and comprises a brush 35 provided in a bore in the end of the shaft and biased by a compression spring 34 into contact with a hard metallic plate 36 which is press-fitted into the recess 23' provided behind the bearing 23 in the partitioning wall 65a.

While no attempt is here made to show the full contour of the cam 29, it being shown as having only one lobe 41, it will be understood that there will be provided as many lobes as are necessary to provide the requisite number of ignition sparks, taking of course into account the gearing ratio between the cam and the engine. Further, from another standpoint, the number of lobes on the cam is determined by the gear ratio between the flux controlling rotor and the cam as the primary winding of the coil 18 is to be broken at each instant the value of the flux in the magnetic circuit reaches a maximum—i. e., at each half revolution of the rotor. In the present instance, the magneto is designed for a four-cycle nine-cylinder engine, and accordingly the flux-controlling rotor is driven 2¼ times the engine speed, so as to be capable of producing 4½ flux changes (or ignition sparks) per engine revolution, and the cam 29, being coupled directly to the distributor as is hereinafter described, is driven at one-half engine speed. Thus the cam will have nine lobes and be driven 4½ times slower than the rotor. Were the cam driven directly from the rotor the necessary gearing, because of its high transmission ratio, would have to be quite large and the overall dimensions of the magneto would be increased. However, in the present instance, since the drive shaft 4 is moving at a fraction of the rotor speed, I am enabled to obtain the necessary 4½ times in speed ratio between the cam and the rotor by driving the cam from the drive shaft through a gearing having a drive transmission ratio of much less than 4½ times. A gearing of such small ratio may be made quite small, as shown in Figure 1, and the overall dimensions of the magneto may accordingly be reduced.

The distributor for the magneto comprises a rotary arm 53 shown in Figure 9, and a stationary block 61 of a generally circular form shown in Figure 6, each of which are moldings of a suitable insulating material into which are embedded contact elements as are hereinafter described. The rotary arm 53 is carried on the end of the shaft 24, being mounted on the plate 30 (which is integral with the cylindrical wedge 31 as aforementioned) and secured to this plate by screws 55 which thread into holes 52 in the plate. The block 61 is carried by the housing section 64 adjacent the rotary arm for cooperation therewith, as shown in Figure 1. The rotary arm and block are shaped to intermesh with one another at their adjacent faces so as to provide suitable leakage barriers between the different cooperating contact elements of the distributor, there being for instance on the block 61 a central boss 61a and a concentric annular flange 61b, and on the rotary arm 53 an annular flange 53a, which is interposed between the boss 61a and flange 61b of the block, and outer arcuate segmental projections 56 and 57 which overlie the flange 61b.

The rotary arm 53 has a main segment 59 which moves past terminals 60 in the distributor block, the latter being circularly arranged and equal in number to the number of cylinders to be fired. The main segment 59 has a direct connection with a high tension terminal 83 on the coil 18, this connection being made through a conductor 59' in the rotary arm to a central plate 53 carried thereby, from the plate 58 to a brush 58' in the boss 61a of the block, and from the brush 58' through a conductor 58'' in the block to another brush 83' in the block, which latter brush engages the terminal 83 when the block is in mounted position, as shown in Figure 1. (It will be understood that the terminal 83 is connected within the coil 18 to one side of the secondary winding of the coil and that the other side of this winding is grounded to the frame of the machine.) Thus high tension current is conducted from the coil to the main segment 59 of the distributor arm, from whence it jumps successively to the terminals 60 as the distributor arm is rotated. The current from the distributor terminals is conducted to the engine spark plugs by a cable (not shown), the separate leads of which are received by channels 68 in the block, wherein the leads suitably connect to the distributor terminals.

The cable to the spark plugs is led through an elbow 67 in the top of the housing. A fitting 72 on the end of the elbow is provided for connection of the elbow to a flexible metallic tubing (not shown) through which the cable may run, the metallic tubing being provided to shield outside apparatus from electrical disturbances arising from the ignition current. The elbow 67 is retained to the housing section 64 by means of screws 73 which pass through ears 73' on the elbow and thread into the housing section, as shown in Figure 5. The apertures in the ears through which the screws pass are in the form of slots to permit angular adjustment of the elbow in the direction desired.

A secondary or trailer segment 62 on the rotary arm 53 is provided so that ignition current from a separate source—for example, a hand-operated magneto—may, if desired, be conducted to the distributor terminals during engine starting. In this case the starting ignition current is conducted to a ring 63 in the distributor block by means of a lead (not shown) which may enter the magneto housing through one of the outlets 70 and 71 in the elbow 67 and then lead into a channel 68" in the distributor block wherein it suitably connects with the ring 63 as shown in Figure 1. No direct connection between the ring 63 and secondary segment 62 is provided; instead a screw 84 is threaded into the distributor arm against the segment as shown in Figure 9, and positioned so that its head will be adjacent the ring when the distributor is assembled as shown in Figure 1, the spacing between the head and ring being sufficiently close to permit the starting ignition current to jump the gap therebetween.

A characteristic of the present magneto which renders it particularly well suited for use in the aircraft field is that it is small and light in weight. These highly desirable structural features are not attained at a sacrifice in operation; but, to the contrary, the operation of this magneto is even improved over that of larger and heavier conventional types. Some of the improvements in this magneto are due to the particular structural features hereinbefore described, and especially is the reduction in size of the magneto largely attributable to the novel and compact arrangement of its components; but, more generally and basically, the improvements in this magneto are the result of more fundamental principles involved in its design.

The adaptation of magnetos of the rotary-magneto type to engines having higher numbers of cylinders has invariably been done by the easy expedient of increasing the number of poles on the rotor instead of increasing the rotor speed. I have found, however, that such mode of adaptation is by no means as effective as that of using a permanent-magnet rotor of a low number of poles and of then producing the requisite number of ignition sparks per engine revolution by stepping-up the speed of the rotor. This is the mode of adaptation employed in the present illustrative embodiment of my invention. Here, the magneto is designed to fire a four-cycle nine-cylinder engine, yet it employs a rotor of only two poles, the rotor being accordingly driven above engine speed, by 2¼ times, to produce the requisite number of ignition sparks per engine revolution. There is a marked improvement in efficiency in using a permanent-magnet rotor of two poles in place of one of a larger number of poles. In a two-pole rotor, each pole shoe may subtend an angle at the center of the rotor of approximately 90°. This, for example, is roughly twice as great as that which the pole shoes of a four-pole rotor would subtend. Thus, for a given overall size of rotor, each pole face in a rotor of the two-pole type will have about twice the area as that which they would have in a rotor of the four-pole type. As is well known, the reluctance in the magnetic circuit of a magneto is largely made up of that of the air gaps between the rotor and pole pieces. The reluctance of the gap, being inversely proportional to the area of the flux path through the gap, decreases as the area of the pole faces of the rotor is increased. Thus, an increase in this pole-face area, by the use of a rotor of only two poles instead of one of a greater number of poles, permits a marked reduction in the reluctance of the magnetic circuit without involving any increase in the overall size of the magneto. This reduction in reluctance is of prime importance in improving the overall efficiency of the magneto, as the overall efficiency of the magneto is found to be inversely proportional to a higher-than-unity power of the reluctance.

The improvement in the overall efficiency of the present magneto is also in part due to the increase in speed at which the rotor is driven. The benefit from an increase in rotor speed may be explained in terms of a so-called ideal value of efficiency for the magneto. This ideal value is that which would be obtained could the resistance in the primary circuit of the magneto be made zero. In taking into account the resistance in the primary circuit, however, it is found that the actual magneto efficiency approaches this ideal value as the frequency of the forced oscillations in the primary circuit—i. e., as the speed of the rotor causing these forced oscillations—is increased. The approach of the actual efficiency to the ideal, for increasing rotor speed, is asymptotic—i. e., as the rotor speed increases, the actual efficiency increases rapidly at first and then tapers off to theoretically reach the ideal value only at infinite rotor speed. The speed above which no substantial improvement in the actual efficiency will be obtained is determined by the relative values of the resistance and inductance in the primary circuit. It is found, in typical cases, that this speed is well above engine running speeds and that therefore a substantial improvement in the magneto efficiency, within the normal range of operation, may be obtained by stepping-up the rotor speed.

At low running speeds of the rotor, such as at the speeds at which engines are driven during starting, the magneto efficiency varies substantially linearly with, and in approximately the same degree as, the rotor speed. Thus although the gain in efficiency obtained from a given step-up in rotor speed tapers off at the relatively high running speeds of the engine (the degree of which taper depends upon the constants of the primary circuit) the gain at engine starting speeds will be in each case in substantially the same ratio as that in which the rotor speed is stepped-up. Accordingly, in the present instance, the efficiency of the magneto at engine starting speeds is approximately doubled because of the step-up in rotor speed. This improvement from a step-up in rotor speed—it will be noted—is in addition to that which results from a reduction in the reluctance of the magneto circuit.

It will of course be understood that in cases where an unusually large number of ignition sparks are required per engine revolution, I may employ a rotor having more than two poles but of a number so limited as to require a substantial step-up of the rotor speed over that of the engine, and thus yet realize, at least partially, the advantages flowing from the principles of design herein disclosed. In this connection I may, for example, employ a four-pole rotor, such as is illustrated in Figure 7. This rotor comprises a unitary magnet 77 adapted for mounting of the same on a suitable shaft 105. The magnet has at equal intervals on its periphery four radial projections forming magnet poles 77', which are magnetized so that alternate ones are of like polarity. Fitted on these magnet poles are suitable pole shoes 78 which are held in place by rivets 78'.

Although I have herein shown and described my invention in terms of certain preferred embodiments, it will be understood that the same are subject to many changes and modifications without departure from the scope of my invention, which I endeavour to express according to the following claims.

I claim:

1. A magneto comprising a housing having a mounting face at one end thereof; a drive shaft extending through said one end of the housing; a permanent-magnet rotor journalled in the portion of said housing adjacent said one end thereof, said rotor being disposed in axially parallel relation to said housing end and geared to said drive shaft; field pole pieces operatively associated with said rotor and extending away from said housing end; an ignition coil structure having a core bridging said field pole pieces and a high tension terminal; a timer-distributor shaft disposed in parallel relation to said drive shaft and geared thereto; a circuit-breaker for the primary winding of the ignition coil having a cam mounted on the outer end portion of said timer-distributor shaft; and a distributor for the current of the secondary winding of the ignition coil comprising an arm carried by the outer end portion of said timer-distributor shaft and a block mounted in operative relationship with said distributor rotor, said block including conducting means electrically engaging said high tension terminal at one end and said distributor arm at the other end when the block is in mounted position.

2. The structure as claimed in claim 1 further characterized in that the end of the housing portion encasing said permanent-magnet rotor has a removable cover plate carrying a bearing for said rotor.

3. A magneto comprising a housing having a mounting face at one end thereof; a permanent-magnet rotor journalled in said housing in a position wherein the same is disposed axially along and adjacent to said one end of the housing; pole pieces operatively associated with said rotor and extending away from said housing end; an ignition coil structure having a core bridging said pole pieces and a high tension terminal on the outer surface thereof; a distributor shaft journalled with its axis normal to that of said rotor and having a drive connection with the latter; and a distributor for the high tension current of the ignition coil including a rotary member mounted on said distributor shaft and a block mounted in operative relationship with said rotary member, said block including a conducting means electrically engaging the distributor rotary member at one end and said high tension terminal at the other end when the block is in mounted position.

4. A magneto including a housing having a mounting flange at one end thereof, a drive shaft having a bearing carried by said housing at its mounting end, a rotor carrying a permanent magnet housed within a portion of said housing at said one end thereof and having a gear on its end nearest the drive shaft, a drive gear on the drive shaft closely adjacent the bearing in the mounting end of the magneto and meshing with said first mentioned gear, a second bearing for the drive shaft closely adjacent said drive gear, field pole pieces positioned for cooperation with said rotary magnet and extending in a direction away from the mounting end of the magneto, an ignition coil having a core joining said field pole pieces, a high-tension terminal on the ignition coil structure, a timer-distributor shaft disposed in parallel relation to the drive shaft and spaced only a short distance therefrom and geared thereto; circuit-breaker mechanism for the primary winding of said coil including a cam on said timer-distributor shaft, and a current distributor for the secondary winding of said coil including a rotary member on the outer end of said timer-distributor shaft and a block having a part carrying a conductor engaging said high-tension terminal at one end and said rotary member at the other end.

5. A rotor for a magneto comprising a pair of permanent magnets extending transversely of the shaft of the rotor and disposed on opposite sides of the shaft; arcuate pole shoes fitting the polar ends of the magnet pair; disks secured to the rotor shaft and clamped to bear from opposite sides against said magnets and shoes to hold the same in place on shaft, said shaft having flats on opposite sides thereof at the place of the magnets, and said magnets being positioned closely to said flats and each made segmental in shape whereby to effect a small and compact rotor structure of a substantially cylindrical shape.

6. A rotor for a magneto comprising a pair of permanent magnets of segmental shape disposed transversely of the rotor shaft on opposite sides thereof; pole shoes each having central portions fitting between the magnets and arcuate portions fitting over the polar end portions of the magnets, whereby to contact a substantial portion of the ends of the magnets to provide a magnetic coupling to the magnets of low reluctance; and non-magnetic means on the rotor shaft for holding said shoes and magnets in place on the shaft.

7. In a magneto including a housing having a mounting face at one side thereof: the combination of a drive shaft projecting through said one side of the housing and journalled at right angles to said mounting face; a rotor journalled in said housing in position wherein the same is disposed axially along and is adjacent to said one side of the housing; and a right-angle drive transmission coupling said rotor to said drive shaft.

8. In a magneto including a housing having one side thereof adapted for connection to a support: the combination of a drive shaft projecting through said one side of the housing and adapted for connection to an engine; a rotor journalled in said housing in position wherein the same is disposed axially along and is adjacent to said one side of the housing; and a stepped-up right-angle drive transmission coupling said rotor to said drive shaft for causing the rotor to be turned at a predetermined speed above engine speed.

9. In a magneto including a housing: the combination of a rotor journalled in said housing; a distributor block mounted in said housing and including a set of terminals disposed angularly about an axis normal to the axis of said rotor, said block being offset radially from said rotor and at least partially overlapping the rotor lengthwise thereof; a distributor arm journalled in said housing at said distributor axis for cooperation with said terminals; and a drive transmission, including substantially right-angle gearing, for coupling said rotor to said distributor arm.

10. In a magneto including a housing: the combination of a motor journalled in said housing and adapted to be driven at one end; a distributor block mounted in said housing in position wherein the block is offset radially from said rotor and at least partially overlaps the rotor lengthwise thereof, said block including a set of terminals disposed about an axis normal to the axis of said rotor; a distributor arm in said housing journalled at said distributor axis; a drive tranmission coupling the drive end of said rotor to said distributor arm; pole pieces associated with said rotor; and an ignition coil structure interposed between said rotor and said block in bridging relation with said pole pieces.

11. The subject matter as set forth in claim 10, further including a high-tension terminal on said ignition coil structure, and conducting means associated with said distributor block and adapted to make connection with said high-tension terminal when the coil structure and block are assembled relation.

12. In a magneto including a housing having one side thereof adapted for connection with a support: the combination of a drive shaft journalled in said housing and extending through said one side for connection to an engine; a rotor journalled in said housing axially along and adjacent to said one side; a stepped-up right-angle drive transmission between said rotor and drive shaft for rotating the rotor at a predetermined speed above engine speed; a distributor block offset radially from said rotor and partially overlapping the rotor lengthwise thereof; a rotary distributor arm cooperating with said block, said arm being axially parallel to said drive shaft and having a drive coupling with the latter; pole pieces associated with said rotor; and an ignition coil structure disposed between said rotor and distributor in bridging relation with said pole pieces.

13. In a magneto including a housing having one side thereof adapted for mounting on a support and having a drive shaft journalled in said housing and extending through said one side: the combination of a rotor journalled in said housing in position wherein the same is disposed axially along and is adjacent to said one side; right-angle gearing coupling said drive shaft to said rotor; a distributor block; and a distributor arm journalled to cooperate with said block and coupled to said drive shaft, said arm having its journal axis parallel to said drive shaft and displaced therefrom towards said rotor.

EDWARD B. NOWOSIELSKI.

DISCLAIMER 2,321,506.—*Edward B. Nowosielski*, Bloomfield, N. J. MAGNETO CONSTRUCTION. Patent dated June 8, 1943. Disclaimer filed November 8, 1943, by the assignee, *Edison-Splitdorf Corporation*.

Hereby enters this disclaimer to claim 9, of said patent.

[*Official Gazette December 14, 1943.*]

CERTIFICATE OF CORRECTION.

Patent No. 2,321,506.

June 8, 1943.

EDWARD B. NOWOSIELSKI.

It is hereby certified that error appears in the printed specification of the above numbered patent requiring correction as follows: Page 5, first column, line 53, for "magneto" read --magnet--; page 6, second column, line 34, claim 5, before "shaft" first occurrence, insert --the--; line 46, claim 6, for "fiting" read --fitting--; page 7, first column, line 12, claim 10, for "motor" read --rotor--; and that the said Letters Patent should be read with this correction therein that the same may conform to the record of the case in the Patent Office.

Signed and sealed this 14th day of March, A. D. 1944.

Leslie Frazer (Seal)

Acting Commissioner of Patents.